United States Patent
Yoshimura et al.

(10) Patent No.: US 6,291,094 B1
(45) Date of Patent: Sep. 18, 2001

(54) SEPARATOR FOR FUEL CELL, FUEL CELL INCORPORATING THE SAME, AND METHOD OF PRODUCTION OF THE SAME

(75) Inventors: Joji Yoshimura, Toyota; Yasuhiro Nonobe, Nishikamo-gun; Keiji Yamane, Hikari, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/303,997

(22) Filed: May 3, 1999

(30) Foreign Application Priority Data

| | | |
|---|---|---|
| May 7, 1998 | (JP) | 10-142189 |
| Aug. 24, 1998 | (JP) | 10-254625 |
| Apr. 28, 1999 | (JP) | 11-122495 |

(51) Int. Cl.$^7$ .............................. H01M 2/14; H01M 2/16
(52) U.S. Cl. ................... 429/34; 429/38; 429/39; 427/115
(58) Field of Search ........................ 429/34, 38, 39; 427/115

(56) References Cited

U.S. PATENT DOCUMENTS

| | | | |
|---|---|---|---|
| 5,624,769 | 4/1997 | Li et al. | 429/32 |
| 5,798,188 | * 8/1998 | Mukohyama et al. | 429/34 |
| 6,090,228 | * 7/2000 | Hwang et al. | 429/34 |

FOREIGN PATENT DOCUMENTS

| | | |
|---|---|---|
| 19523637 | 7/1996 | (DE) . |
| 19523673 | 7/1996 | (DE) . |
| 19627504 | 10/1997 | (DE) . |
| 0889536 | 1/1999 | (EP) . |
| 7-282821 | 10/1975 | (JP) . |
| 5-182679 | 7/1993 | (JP) . |
| WO9635825 | 11/1996 | (WO) ............................ C23C/28/00 |
| WO9735349 | 9/1997 | (WO) ............................ H01M/2/22 |

OTHER PUBLICATIONS (Reese Puckett, Stephen L. Michel, William E. Hughes), Ion Beam Etching, Thin Film Processes II, V2, 749–782, 1991.*
Patent Abstracts of Japan, vol. 006, No. 194 (E–134), Oct. 2, 1982 (1982–10–02) & JP 57 105974 A (Tohsiba Corp), Jul. 1, 1982 (1982–07–01).

* cited by examiner

*Primary Examiner*—Mark F. Huff
*Assistant Examiner*—Daborah Chacko-Davis
(74) *Attorney, Agent, or Firm*—Kenyon & Kenyon

(57) ABSTRACT

An inexpensive and corrosion resistant metal-made gas separator includes a base formed by joining formed stainless steel base sheets face to face. The base carries on each of opposite surfaces thereof a first coating layer formed by plating with tin. The base is also coated with a second coating layer of a thermal expansion graphite. When incorporated into a fuel cell, the separator contacts gas diffusion electrodes that are formed from a carbon material similar to the carbon material of the second coating layer, so that the contact resistance is reduced. The first coating layer is formed after a passive state coating is removed from the stainless steel surface, so that an increase in the internal resistance of the separator caused by the passive state coating is substantially prevented.

23 Claims, 10 Drawing Sheets

(a): STAINLESS STEEL ALONE
(b): STAINLESS STEEL+TIN PLATING
(c): STAINLESS STEEL+NICKEL PLATING
(d): THERMAL EXPANSION GRAPHITE ALONE
▨ : WITHOUT THERMAL EXPANSION GRAPHITE COATING
▧ : WITH THERMAL EXPANSION GRAPHITE COATING

●○ : STAINLESS STEEL ALONE
▲△ : STAINLESS STEEL+TIN PLATING
◆◇ : STAINLESS STEEL+TIN PLATING
   +THERMAL EXPANSION GRAPHITE (SEPARATOR 30)

SEPARATOR FOR FUEL CELL, FUEL CELL INCORPORATING THE SAME, AND METHOD OF PRODUCTION OF THE SAME

BACKGROUND OF THE INVENTION

1. Field of the Invention

The present invention relates to a gas separator for use in a fuel cell, and a fuel cell incorporating the gas separator, and a method of production of the gas separator. More particularly, the invention relates to a fuel cell gas separator which is provided between adjacent unit cells in a fuel cell formed by stacking a plurality of unit cells, and which forms a fuel gas passage and an oxidative gas passage, together with adjacent members, and separates a fuel gas and an oxidative gas from each other, and a fuel cell incorporating the gas separator, and a method of production of the gas separator.

2. Description of the Related Art

A fuel cell gas separator is a component member of a fuel cell stack formed by stacking a plurality of unit cells. The gas separator has a sufficiently high gas impermeability so as to prevent mixture of a fuel gas and an oxidative gas that are supplied to adjacent unit cells. A typical fuel cell gas separator is formed by using a carbon material or a metal material. Normally, metal materials have excellent strength, and therefore allow formation of a thinner gas separator than carbon materials. This allows the size of a fuel cell to be reduced. Furthermore, metal-made gas separators can be produced by a simple and easy methods, for example, by pressing a metal sheet, so that the gas separator production process can be simplified and made less time-consuming. Therefore, adoption of a metal-made gas separator improves productivity and controls the production costs.

For production of a metal-made gas separator, a suitable metal may be selected from metals having sufficiently high electric conductivity, strength and formability. Normally, an anticorrosion measure is needed to secure a sufficiently high corrosion resistance of the gas separator under environmental conditions for the operation of a fuel cell. One example of a measure for improving the corrosion resistance of a gas separator is to coat a gas separator with a metal having a good corrosion resistance, for example, platinum, gold, rhodium, iridium and the like (described in, for example, Japanese Patent Application Laid-Open No. HEI 5-182679).

However, these metals are rarely-occurring natural resources, and the use of such a costly noble metal increases the production cost of a fuel cell. Furthermore, if plating or the like method is employed for the metal coating process, the problem of formation of micro-holes in the coating surface is likely to arise. If there are holes in a coating surface, corrosion advances gradually therefrom. Thus, if a gas separator is coated with a noble metal as mentioned above, it is still difficult to secure a sufficiently high corrosion resistance. An attempt may be made to restrict the effect of corrosion starting at holes in a coating surface within an allowable range. However, this attempt necessitates an increase in the coating thickness, thereby increasing the amount of noble metal used. A technology for achieving an improved corrosion resistance of a gas separator by coating it with nickel is known (for example, Japanese Patent Application Laid-Open No. HEI 7-282821). In some cases, however, the nickel coating fails to secure a sufficiently high corrosion resistance under environmental conditions for the operation of a polymer electrolyte fuel cell.

SUMMARY OF THE INVENTION

Accordingly, it is an object of the present invention to achieve a sufficiently high corrosion resistance of a metal-made gas separator without using a costly material.

In accordance with one aspect of the invention, a separator for a fuel cell includes a metallic base member, a first coating layer covering at least a portion of a surface of the base member, the first coating layer being formed from a first electrically conductive material, and a second coating layer covering at least a face where the first coating layer is formed, the second coating layer being formed from a second electrically conductive material different from the first electrically conductive material. The first coating layer being formed at least on a face of the separator that contacts another fuel cell component member when the separator is incorporated into the fuel cell.

In the above aspect of the invention, the second electrically conductive material may be a carbon material.

In the gas separator for a fuel cell of the invention, a metal-made gas separator base member is coated with an electrically conductive material other than carbon and with a carbon material, so that a sufficiently high corrosion resistance can be achieved without using a costly material, such as a noble metal. The separator has a carbon material coating on a contact face that contacts an adjacent member (for example, a gas diffusion electrode) when the separator is incorporated into a fuel cell. Since the adjacent member is also formed of a carbon material, the contact resistance between the carbon material coating of the separator and the adjacent member can be reduced. Thus, the provision of the first coating layer of an electrically conductive material and the second coating layer secures a sufficiently high corrosion resistance and a sufficiently high electric conductivity. Therefore, it becomes possible to form a base member of the separator from a metal that has a sufficiently high electric conductivity and that is low cost but which is insufficient in corrosion resistance, for example, stainless steel, aluminum and the like.

Fuel cells into which the separator is incorporated are able to maintain sufficiently high performance over long hours of use since an increase in the internal resistance caused by corrosion of the gas separator does not occur.

In the above aspect of the invention, the carbon material of the second coating layer may be a thermal expansion graphite.

Use of a thermal expansion graphite eliminates the need to add a binder to the carbon material for the second coating layer when the second coating layer is to be formed by press-fitting the carbon material onto the separator base member. Therefore, a reduction in the electric conductivity of the separator surface caused by a binder is eliminated.

The base member may be electrically conductive at least in a region thereof where the first coating layer is formed. If the separator base member forms a substantially non-electrically conductive coating on a surface thereof, the substantially non-electrically conductive coating may be removed from the surface of the separator base member before the first coating layer is formed thereon.

By removing a substantially non-electrically conductive coating from the separator base member, a sufficiently high electric conductivity between the base member and the second coating layer covering the first coating layer can be secured, so that the internal resistance of the separator can be sufficiently reduced. Therefore, if the separator base member is formed from stainless steel, which tends to form a passive state film on its surface, or aluminum, which tends to form an oxide film on its surface, the separator for a fuel cell attains a sufficiently high electric conductivity.

In the separator for a fuel cell of the invention, the first coating layer may have a rough surface.

If the first coating layer ha s a rough surface, it becomes possible to increase the adhesion strength between the first coating layer and the second coating layer and to increase the contact area therebetween and therefore decrease the contact resistance.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
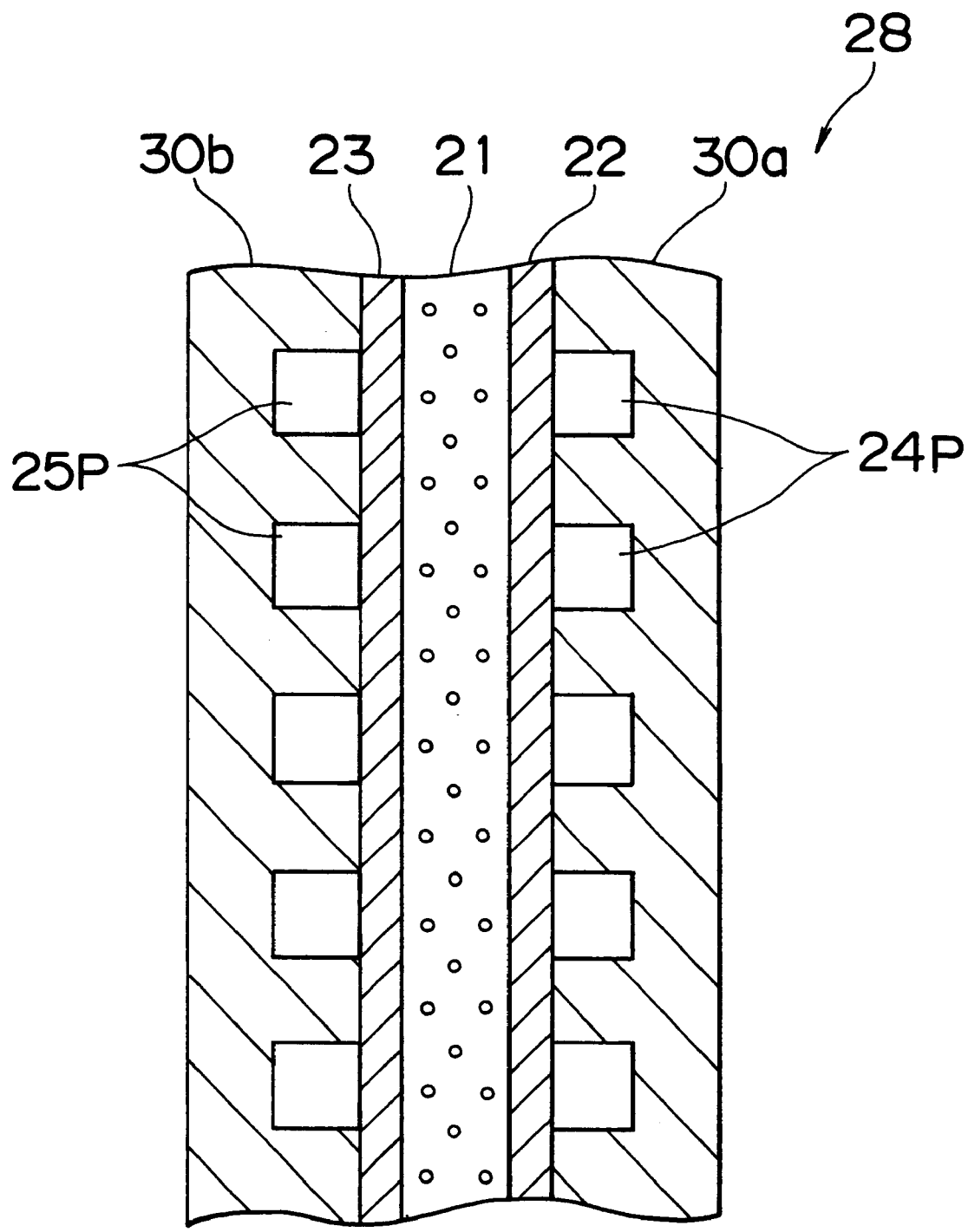
FIG. 1 is a schematic sectional view of the construction of a unit cell, that is, a component unit of a fuel cell.
Figure 2:
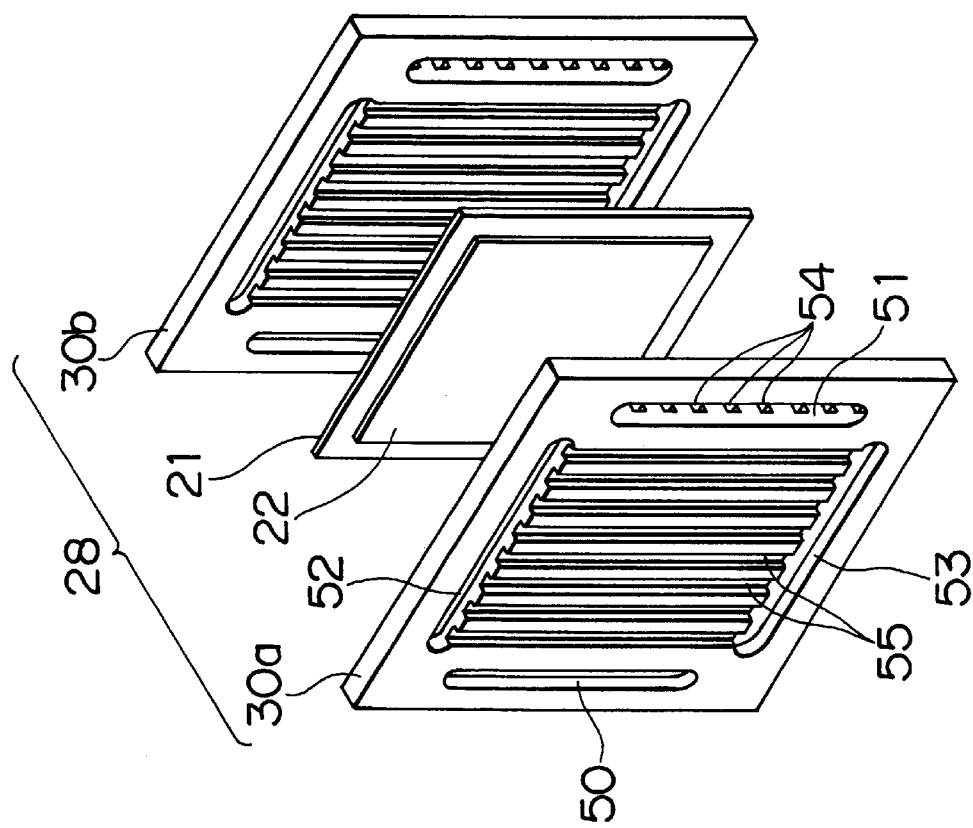
FIG. 2 is an exploded perspective view of the unit cell shown in FIG. 1.
Figure 3:
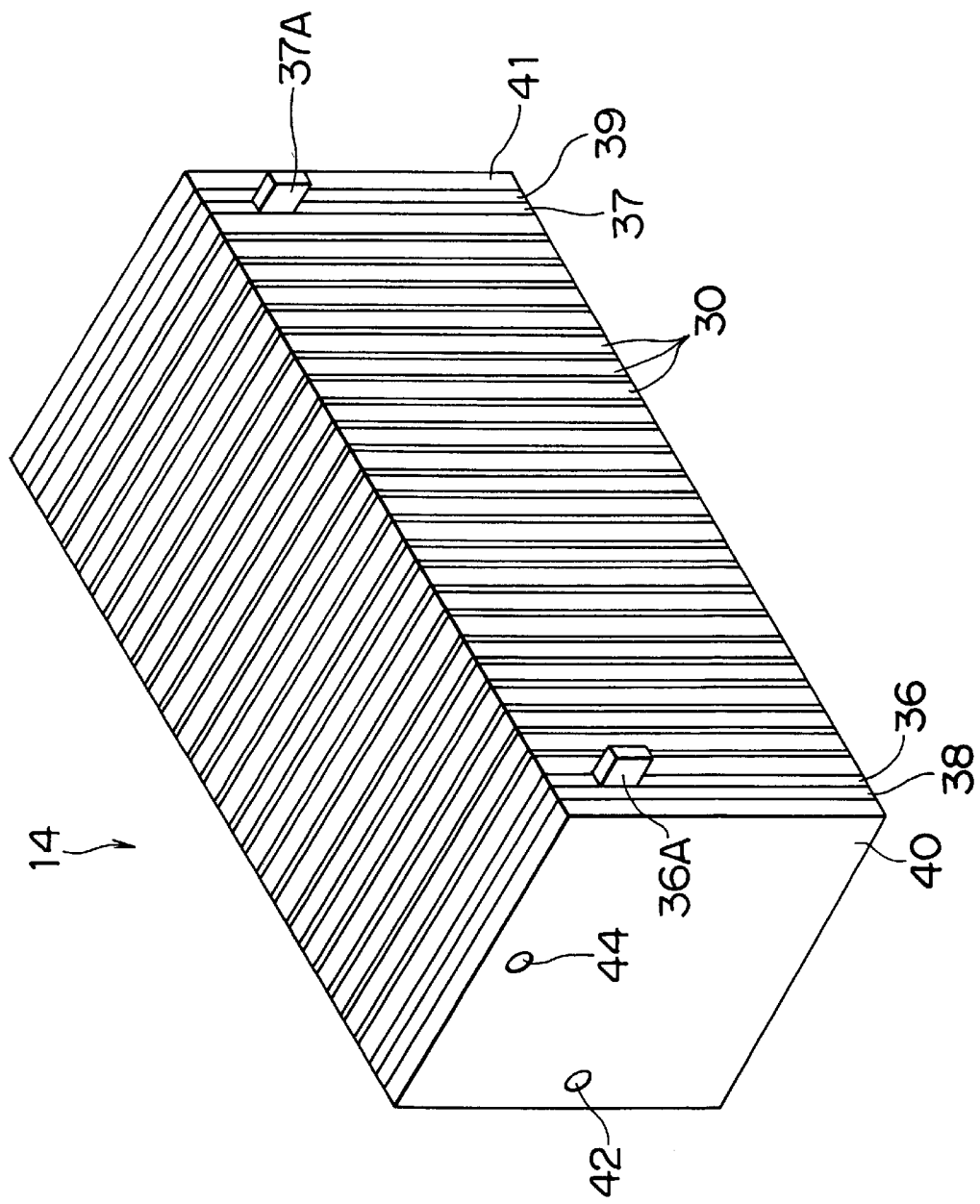
FIG. 3 is an external perspective view of a stack structure formed by stacking unit cells.

A fuel cell has a stack structure formed by stacking a plurality of component unit cells. FIG. 1 is a schematic sectional view of an example of the construction of a unit cell 28, that is, a component unit of a fuel cell. FIG. 2 is an exploded perspective view of the unit cell 28. FIG. 3 is an external perspective view of a stack structure 14 formed by stacking unit cells 28.

The fuel cell according to a preferred embodiment is a polymer electrolyte fuel cell. The polymer electrolyte fuel cell has, as an electrolyte membrane, a solid polymer membrane that exhibits good electric conductivity in a humid condition. In each fuel cell, an anode is supplied with a fuel gas containing hydrogen, and a cathode is supplied with an oxidative gas containing oxygen, so that the following electrochemical reactions occur.

$$H_2 \rightarrow 2H^+ + 2e^- \quad (1)$$

$$\tfrac{1}{2} O_2 + 2H^+ + 2e^- \rightarrow H_2O \quad (2)$$

$$H_2 + \tfrac{1}{2} O_2 \rightarrow H_2O \quad (3)$$

Equation (1) expresses a reaction that occurs at the anode in a fuel cell. Equation (2) expresses a reaction that occurs at the cathode. In the fuel cell as a whole, a combined reaction expressed by Equation (3) occurs. As indicated by the equations, the fuel cell converts a chemical energy of a fuel supplied to the cell directly into an electric energy, and achieves a very high energy efficiency as well known. The unit cell 28, that is, a component unit of the fuel cell, is made up of an electrolyte membrane 21, an anode 22, a cathode 23, separators 30*a*, 30*b* as shown in FIG. 1.

The anode 22 and the cathode 23 are gas diffusion electrodes, and sandwich the electrolyte membrane 21. The sandwich-like electrode arrangement is further sandwiched by the separators 30*a*, 30*b* disposed opposite sides of the arrangement. Fuel gas passages 24P and oxidative gas passages 25P are formed between the separator 30*a* and the anode 22 and between the separator 30*b* and the cathode 23, respectively. During assembly of a fuel cell, a plurality of unit cells 28 are stacked to form the stack structure 14 as shown in FIG. 3.

In FIG. 1, it appears that each of the separators 30*a*, 30*b* has ribs that define gas passages, only on one side thereof. In reality, however, each of the separators 30*a*, 30*b* has ribs 54 and ribs 55 on two sides as shown in FIG. 2. The ribs 54 on one side of each of the separators 30*a*, 30*b* define, together with the adjacent anode 22, the fuel gas passages 24P. The ribs 55 on the other side define the oxidative gas passages 25P, together with the adjacent cathode 23 (of the adjacent unit cell). Thus, the separators 30*a*, 30*b* serve to form the gas passages together with the adjacent gas diffusion electrodes and to separate the fuel gas and the oxidative gas that flow in adjacent unit cells. The separators 30*a*, 30*b* are not different from each other in configuration or operation in a real fuel cell, and will hereinafter be collectively referred to as "separators 30".

The shape and pattern of the ribs 54, 55 on the opposite surfaces of each separator 30 can be determined as desired, as long as the ribs form a gas passage that allows the fuel gas or the oxidative gas to be supplied to the corresponding gas diffusion electrode. In this embodiment, the ribs 54 (55) on each side surface of each separator 30 extend parallel, forming parallel grooves therebetween. In the schematic illustration of the unit cell 28 in FIG. 1, the fuel gas passages 24P and the oxidative gas passages 25P extend parallel. In separators 30 for use in actual assembly of a fuel cell, the ribs 54 on one side surface of each separator 30 may extend substantially perpendicular to the ribs 55 on the opposite side surface (as shown in FIG. 2).

The electrolyte membrane 21 is a proton-conductive ion exchange membrane formed from a solid polymer material, for example, a fluorine-based resin. The electrolyte membrane 21 exhibits good electric conductivity when it is wet. In this embodiment, a Nafion membrane (by DuPont) is used to form the electrolyte membrane 21. Platinum or an alloy of platinum and another metal has been applied, as a catalyst, to a surface of the electrolyte membrane 21.

The anode 22 and the cathode 23 are formed from carbon cloths produced by weaving carbon filaments. Preferably, the anode 22 and the cathode 23 are formed from a carbon felt or a carbon paper formed of carbon fiber or filaments.

As shown in FIG. 2, each separator 30 has four holes in a peripheral portion thereof, that is, two oxidative gas holes 50, 51 iterconnecting the fuel gas passages 24P formed by the ribs 54, and two fuel gas holes 52, 53 interconnecting the oxidative gas passages 25P formed by the ribs 55. In an assembled fuel cell, the fuel gas holes 50, 51 of the individual separators 30 form a fuel gas supply manifold and a fuel gas exhaust manifold, respectively, that extend through the interior of the fuel cell in the stacking direction. The oxidative gas holes 52, 53 of the individual separators 30 form an oxidative gas supply manifold and an oxidative gas exhaust manifold, respectively, that extend through the interior of the fuel cell in the stacking direction.

To assemble a fuel cell, the above-described component members are sequentially stacked in the order of a separator 30, an anode 22, an electrolyte membrane 21, a cathode 23, another separator 30, and so on, to form a stack of unit cells 28. After that, collecting plates 36, 37, insulating plates 38, 39, and end plates 80, 85 are sequentially disposed on the opposite ends of the stack of the unit cells 28, thereby completing a stack structure 14 as shown in FIG. 3. The collecting plates 36, 37 have output terminals 36A, 37A, respectively, for outputting an electromotive force produced by the fuel cell.

The end plate 40 has two holes as shown in FIG. 3, that is, a fuel gas hole 42 and an oxidative gas hole 44. Each of the collecting plate 36 and the insulating plate 38 adjacent to the end plate 40 has two holes similar in shape and corresponding in position to the two holes 42, 44 of the end plate 40. The fuel gas hole 42 opens to a central portion of the fuel gas hole 50 of the adjacent separator 30. For operation of the fuel cell, a fuel gas supply device (not shown) is connected to the fuel gas hole 42 in order to supply a hydrogen-rich fuel gas into the fuel cell. Similarly, the oxidative gas hole 44 is formed at a position corresponding to a central portion of the oxidative gas hole 52 of the separator 30. For operation of the fuel cell, an oxidative gas supply device (not shown) is connected to the oxidative gas hole 44 in order to supply an oxygen-containing oxidative gas into the fuel cell. The fuel gas supply device and the oxidative gas supply device humidify and pressurize the respective gasses to predetermined extents before supplying them to the fuel cell.

The end plate 41 has two holes at positions different from the positions of the two holes in the end plate 40. Each of the insulating plate 39 and the collecting plate 37 has two holes corresponding in position to the two holes of the end plate 41. One of the two holes of the end plate 41 is a fuel gas hole that opens at a position corresponding to a central portion of the fuel gas hole 51 of each separator 30. The other hole of the end plate 41 is an oxidative gas hole that opens at a position corresponding to a central portion of the oxidative gas hole 53 of each separator 30. For operation of the fuel cell, a fuel gas exhaust device (not shown) and an oxidative gas exhaust device (not shown) are connected to the fuel gas hole (not shown) and the oxidative gas hole (not shown) of the end plate 41, respectively.

The stack structure 14 made up of the above-described members is retained with a pressurizing force acting in the stacking direction, thereby completing a fuel cell. An arrangement for pressurizing the stack structure 14 is omitted from the illustrations in the drawings.

The flow of the fuel gas and the flow of the oxidative gas in the fuel cell constructed as described above will be described below. The fuel gas is supplied from the aforementioned fuel gas supply device into the fuel cell via the fuel gas hole 42 of the end plate 40. The fuel gas is then supplied into the fuel gas passages 24P of each unit cell 28 via the fuel gas supply manifold, so that the fuel gas is consumed by the electrochemical reaction that occurs on the anode side in each unit cell 28. Flows of the fuel gas from the fuel gas passages 24P of the unit cells 28 gather in the fuel gas exhaust manifold, and the confluence of the fuel gas moves to the fuel gas hole of the end plate 41. The fuel gas is then discharged from the fuel cell via the fuel gas hole of the end plate 41, and then led to the fuel gas exhaust device.

Similarly, the oxidative gas is supplied from the aforementioned oxidative gas supply device into the fuel cell via the oxidative gas hole 44 of the end plate 40. The oxidative gas is then supplied into the oxidative gas passages 25P of each unit cell 28 via the oxidative gas supply manifold, so that the oxidative gas is consumed by the electrochemical reaction that occurs on the cathode side in each unit cell 28. Flows of the oxidative gas from the oxidative gas passages 25P of the unit cells 28 gather in the oxidative gas exhaust manifold, and the confluence of the oxidative gas moves to the oxidative gas hole of the end plate 41. The oxidative gas is then discharged from the fuel cell via the oxidative gas hole of the end plate 41, and then led to the oxidative gas exhaust device.

The construction of each separator 30 according to the invention will be described below.

Figure 4:
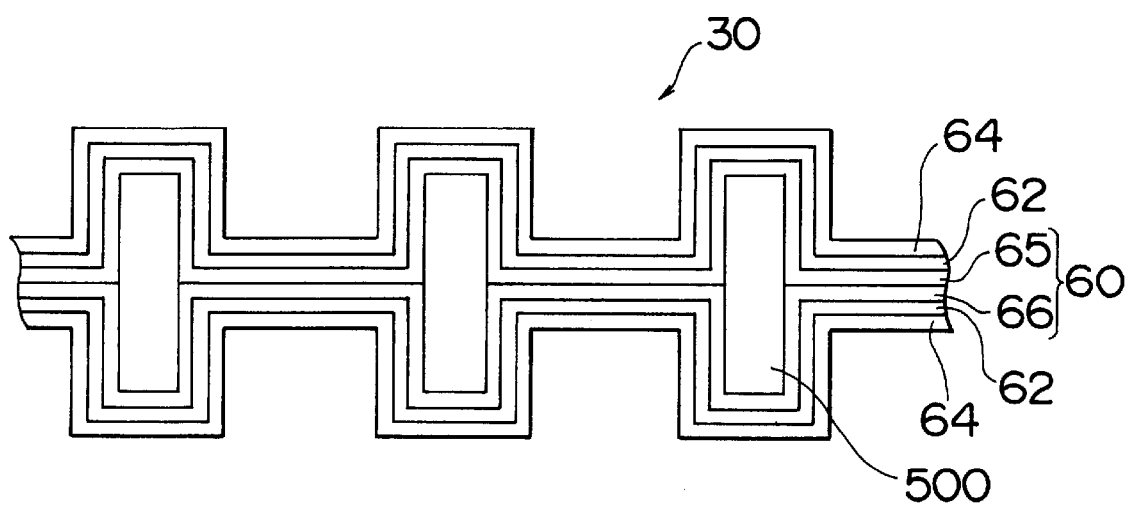
FIG. 4 is a schematic sectional view of a separator.
Figure 5:
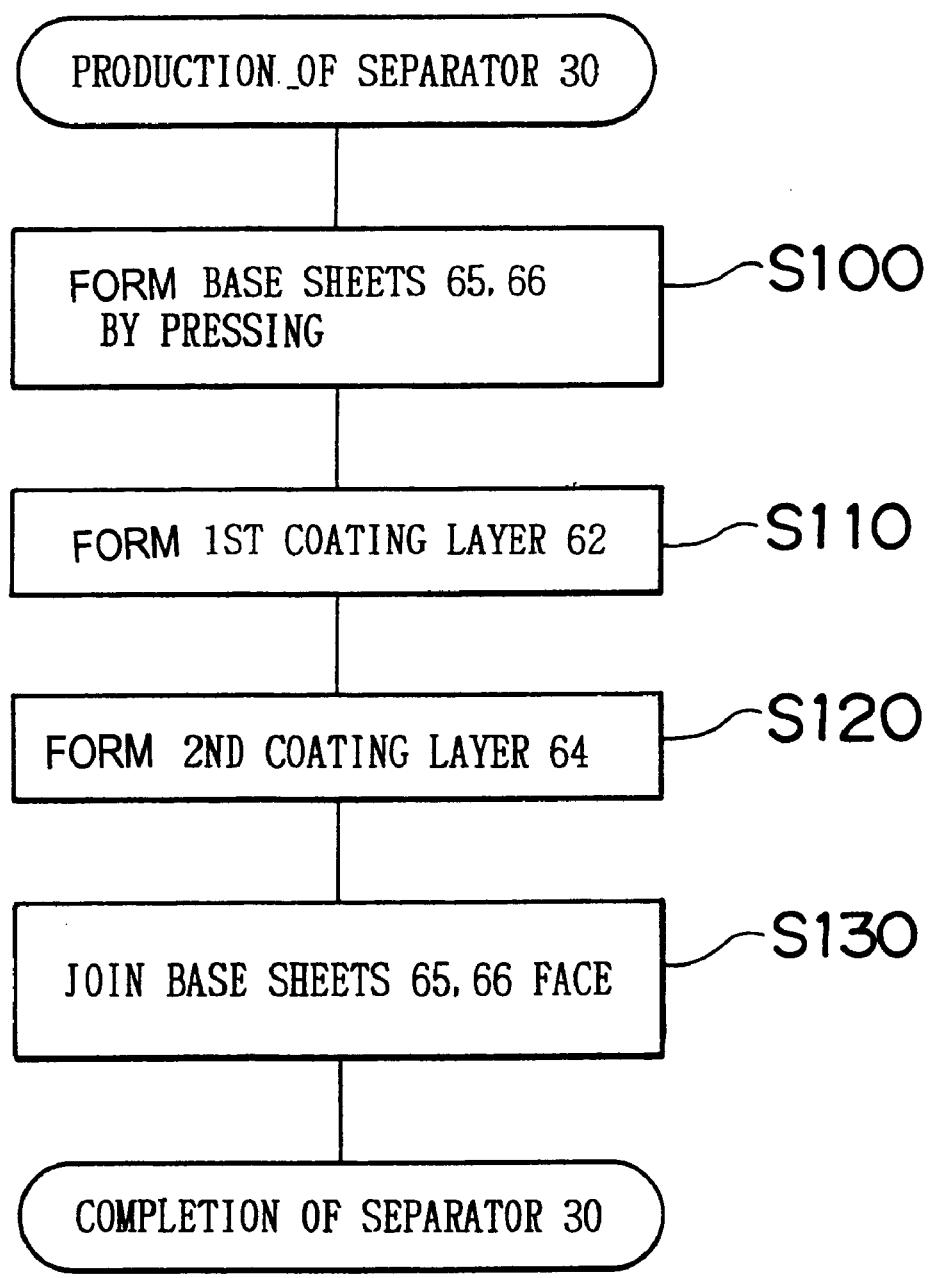
FIG. 5 illustrates a production process of the separator.

FIG. 4 is a schematic sectional view of a separator 30 according to the embodiment of the invention. A base 60 of the separator 30 is formed by joining, face to face, two stainless-steel base sheets 65, 66 having predetermined corrugations or ridges and grooves. Two opposite surfaces of the base 60 are coated with first coating layers 62 of tin. Each first coating layer 62 is coated with a second coating layer 64 of a thermal expansion graphite. FIG. 5 illustrates steps of forming the separator 30.

To produce a separator 30, the two base sheets 65, 66 having predetermined corrugations are formed by mechanically pressing thin stainless steel sheets in step S100. The corrugated shape formed by pressing makes it possible to form the fuel gas passages 24P and the oxidative gas passages 25P when the separator 30 is incorporated in a fuel cell. As for the base sheets 65, 66 having predetermined corrugations formed by mechanically pressing stainless steel sheets in step S100, it is possible to use a bulged stainless steel sheet, a bent stainless steel sheet, a half-sheered stainless steel sheet formed by partially blanking out a stainless steel sheet, or the like. For example, as a stainless steel sheet, Fe—Cr stainless steel such as martensitic stainless steel or ferritic stainless steel, or Fe—Ni—Cr stainless steel such as austenitic stainless steel, austenic-ferritic stainless steel, or semi-austentic stainless steel may be used.

Subsequently in step S110, the base sheets 65, 66 formed in step S100 are plated with tin to form the first coating layers 62. The first coating layers 62 are formed on surfaces of the base sheets 65, 66 that face outwards when the base sheets 65, 66 are joined face to face. The first coating layers 62 may be formed by using electro-plating or electroless plating or the like. In step S110 of forming the first coating layers 62, the base sheets 65, 66 are subjected to surface treatment to remove a passive state layer from stainless steel sheet surfaces, prior to the plating. The surfaces of the base sheets 65, 66 on which the sheets are joined face to face do not need to be plated, since the surfaces will not be exposed to the fuel gas or the oxidative gas. However, in order to reduce the contact resistance, it is preferable that the two opposite surfaces of each of the base sheets 65, 66 be provided with the first coating layers 62 and the second coating layers 64. For a reduction of the contact resistance, the joining surfaces of the base sheets 65, 66 may be provided only with the first coating layers 62.

Subsequently in step 120, the second coating layer 64 of a thermal expansion graphite is formed on the tin-plated surface (or surfaces) of each of the base sheets 65, 66. The thermal expansion graphite is a carbon material expanded in volume by treating a carbon material, such as natural graphite, carbon black or the like, with an acid, and then heating the material. The thermal expansion graphite has a layer structure formed through the thermal expansion. Layers can be firmly bound to one another by applying a compressing force thereto, so that addition of a binding agent is unnecessary during the formation of the second coating layer 64. In one example, the second coating layer 64 was formed by preparing a carbon sheet of a thermal expansion graphite and press-fitting the carbon sheet onto the surface of the first coating layer 62 formed on the base sheet through the use of a predetermined shape die. In stead of preparing a carbon sheet of a thermal expansion graphite, powder of thermal expansion graphite may be directly press-fitted onto the surface of the first coating layer 62 on each base sheet through the use of a predetermined shape die. During the press-fitting of a thermal expansion graphite layer onto the first coating layer 62, it is preferred to substantially maintain vacuum in the die in order to achieve a sufficiently high adhesion strength. The press-fitting operation may employ a mechanical press technique, hydrostatic pressure, or the like.

Subsequently in step 130, the base sheets 65, 66 provided with the first coating layers 62 and the second coating layers 64 are joined face to face to complete a separator 64. The base sheets 65, 66 can be joined face to face by employing, for example, a method in which the base sheets 65, 66 are adhered by an adhesive such as an electrically conductive paste or the like, or a method in which the base sheets 65, 66 are welded to each other by using ultrasonic waves or the like. That is, any method may be employed to join the base sheets 65, 66 face to face, as long as the method secures a sufficiently high electric conductivity between the base sheets 65, 66. Although in the foregoing description with reference to FIG. 5, the preparation of the base sheets 65, 66 coated with the first coating layers 62 and the second coating layers 64 is followed by the joining of the base sheets 65, 66 face to face, it is also possible to first join the base sheets 65, 66 so as to form the base 60, and then form the first coating layers 62 and the second coating layers 64 on surfaces of the base 60. It is also possible to join the base sheets 65, 66 provided with the first coating layers 62 so as to form the base 60 provided with the first coating layers 62 and then form the second coating layers 64 on the surfaces of the base 60.

The use of separators 30 constructed as described above in a fuel cell achieves a sufficiently high corrosion resistance since the surfaces of each separator 30 are coated with a carbon material made of a thermal expansion graphite. Furthermore, in the assembled fuel cell, the carbon material-coated surfaces of the separators 30 are located adjacent to the carbon material-made gas diffusion electrode. Since the gas separator surfaces and the gas diffusion electrodes are made of carbon materials, the contact resistance between the separators 30 and the gas diffusion electrodes is reduced. Further, since tin, that is, a base metal, and a thermal expansion graphite are used to coat the metal-made separators 30 in order to secure a high corrosion resistance, the production cost increase can be reduced or prevented in comparison with a case where use of a noble metal, such as platinum, rhodium or the like, is required. Still further, the first coating layer 62, that is, a metal plating layer on the separator 30 of this embodiment, is coated with the carbon material, so that advancement of corrosion from micro-holes in the metal plating layer is prevented. Thus, a sufficiently high corrosion resistance is secured. Furthermore, this embodiment makes it possible to simplify the production process of a separator and produce a low-cost separator having an excellent strength.

The separator 30 of the embodiment is produced by plating a stainless steel sheet and then coating the surface with a carbon material, so that a sufficiently high electric conductivity can be achieved. The stainless steel is normally a low-cost metal material having sufficiently high electric conductivity and sufficiently high formability, and therefore preferable as a material of a gas separator. However, the stainless steel surface carries thereon a passive state coating film, so that the direct coating of a surface of a stainless steel sheet member with a carbon material will give rise to a drawback that the passive state coating film increases the contact resistance between the carbon material coating and the stainless steel base sheet. To avoid this drawback, the separator 30 of the embodiment is produced by forming the first coating layer 62 on each of the stainless steel-made base sheets 65, 66 before forming thereon the second coating layer 64 of a carbon material. The passive state layer is removed by surface treatment prior to the plating process of forming the first coating layer 62 on each of the base sheets 65, 66 as described above. Therefore, the separator 30 does not suffer a contact resistance increase caused by the passive state layer on a stainless steel surface. Tin, forming the first coating layer 62 in this embodiment, retains a sufficiently high electric conductivity if oxidized. Therefore, even if tin forming the first coating layer 62 is oxidized before the second coating layer 64 of a thermal expansion graphite is formed thereon, the electric conductivity of the separator 30 is not significantly reduced.

The provision of the first coating layer 62 removes the passive state layer from the surfaces of the base sheets 65, 66, and prevents re-formation of a passive state layer, and secures a sufficiently high electric conductivity between the first coating layer 62 and the second coating layer 64. The provision of the second coating layer 64 secures a sufficiently high corrosion resistance of the separator 30, to which the first coating layer 62 of the separator 30 does not substantially contribute. Therefore, since the first coating layer 62 does not need to be thick, the amount of tin used to form the first coating layer 62 can be minimized and, therefore, the cost increase can be reduced or eliminated.

The metal forming the base sheets 65, 66 of the separator 30 is not necessarily stainless steel but may also be any metal that has sufficiently high electric conductivity, sufficiently high strength and sufficiently high formability, for example, aluminum, nickel, titanium, aluminum alloy such as Al—Mg alloy or Al—Mn alloy, cold rolled steel sheet such as aluminum killed steel, killed steel, rimmed steel or vacuum degassed material, and the like. A suitable metal may be selected from such metals, considering the production cost or the like. If a metal that readily oxidizes in air and forms an oxide film having no substantial electric conductivity, for example, aluminum or the like, is used, the oxide film is removed from the metal base sheet by surface treatment prior to the formation of a metal layer on the base sheet through plating or the like, so that in the produced separator, a contact resistance increase caused by the oxide film can be prevented.

The first coating layer 62 does not need to be formed from a stainless steel, but may also be formed from a different metal that retains electric conductivity if oxidized, for example, nickel, nickel alloy such as Ni—P alloy, Ni—B alloy, Ni—Sn alloy or Ni—Fe alloy, titanium or a ceramic that has electric conductivity. Examples of electrically conductive ceramics include nitrides such as titanium nitride, chrome nitride and the like, and oxides such as tin oxide, tungsten oxide, indium oxide, indium-tin oxide (ITO) and the like. The material of the first coating layer 62 needs merely to be a material which has sufficiently high electric conductivity and which does not form a passive state film or an oxide film having no substantial electric conductivity prior to the formation of the second coating layer 64. Furthermore, the material of the second coating layer 64 needs merely to be capable of being formed, through plating or the like, into a film on a surface of each of the base sheets 65, 66 from which an oxide film or a passive state film has been removed, before a non-electrically conductive film is formed again.

The method for forming the first coating layer 62 from a metal having electric conductivity does not necessarily employ the above-mentioned electroless plating or electroplating but may also employ sputtering or the like. If a ceramic having electric conductivity is used, the first coating layer 62 can easily be formed by sputtering. In particular, if an oxide ceramic is used, the first coating layer 62 may also be formed by spraying a solution containing tin, tungsten or the like to the base sheets 65, 66 and heating them to a high temperature for oxidation.

The second coating layer 64 of a carbon material may be formed by adding a predetermined binder to carbon powder such as natural graphite, carbon black or the like. For example, a resin with acid resistance, such as acryl resin, polyester resin, urethane resin, phenol resin, or phenol-epoxy resin may be added to the second coating layer 64. The second coating layer 64 with the resin achieves a sufficiently high adhesion and prevents an increase of contact resistance. Furthermore, a hardener such as epoxy-resin or methyl-melamine resin for the aforementioned resins may be added to improve adhesion and acid resistance. Moreover, as carbon black, for example, channel black, furnace black or acetylene black may be used. As a graphite, for example, synthetic graphite, crystal graphite or amorphous graphite may be used. If a thermal expansion graphite is used to form the second coating layer 64, it is also preferable to mix the thermal expansion graphite with a different kind of carbon material, such as natural graphite, carbon black or the like. If a carbon layer is formed by compressing thin pieces of thermal expansion graphite, an excellent electric conductivity can be achieved in directions parallel to the layer but an unsatisfactory electric conductivity in directions perpendicular to the layer may result. If a different kind of carbon material is mixed as mentioned above, thin pieces of thermal expansion graphite can be interconnected by the different kind of carbon material, so that sufficiently high electric conductivity can be achieved in directions perpendicular to the layer (that is, in the stacking directions in a fuel cell) as well. The aforementioned different kind of carbon material to be mixed with the thermal expansion graphite may be any carbon material as long as the particle size and the amount of the different kind of carbon material used are such that thin pieces of the thermal expansion graphite are sufficiently interconnected by the different kind of carbon material. If the amount of the different kind of carbon material to be mixed with the thermal expansion graphite is equal to or less than a predetermined amount, there is no need to add a binder when the thermal expansion graphite and the different kind of carbon material are compressed to form a carbon layer, that is, a carbon layer can be formed by the binding property of the thermal expansion graphite.

Figure 6:
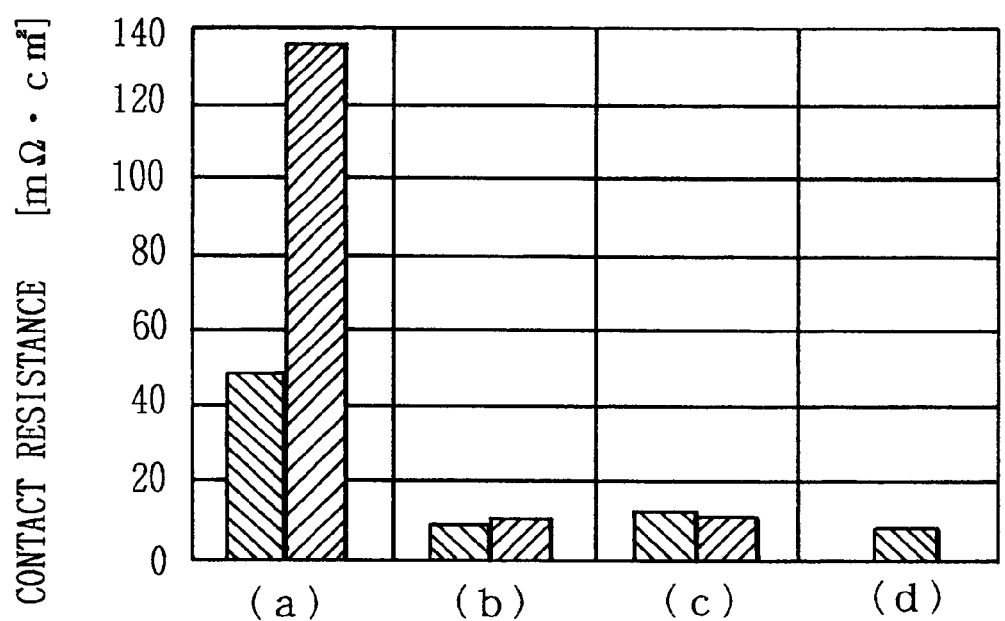
FIG. 6 is a diagram indicating the contact resistance per unit area exhibited by various fuel cell batteries.
Figure 7:
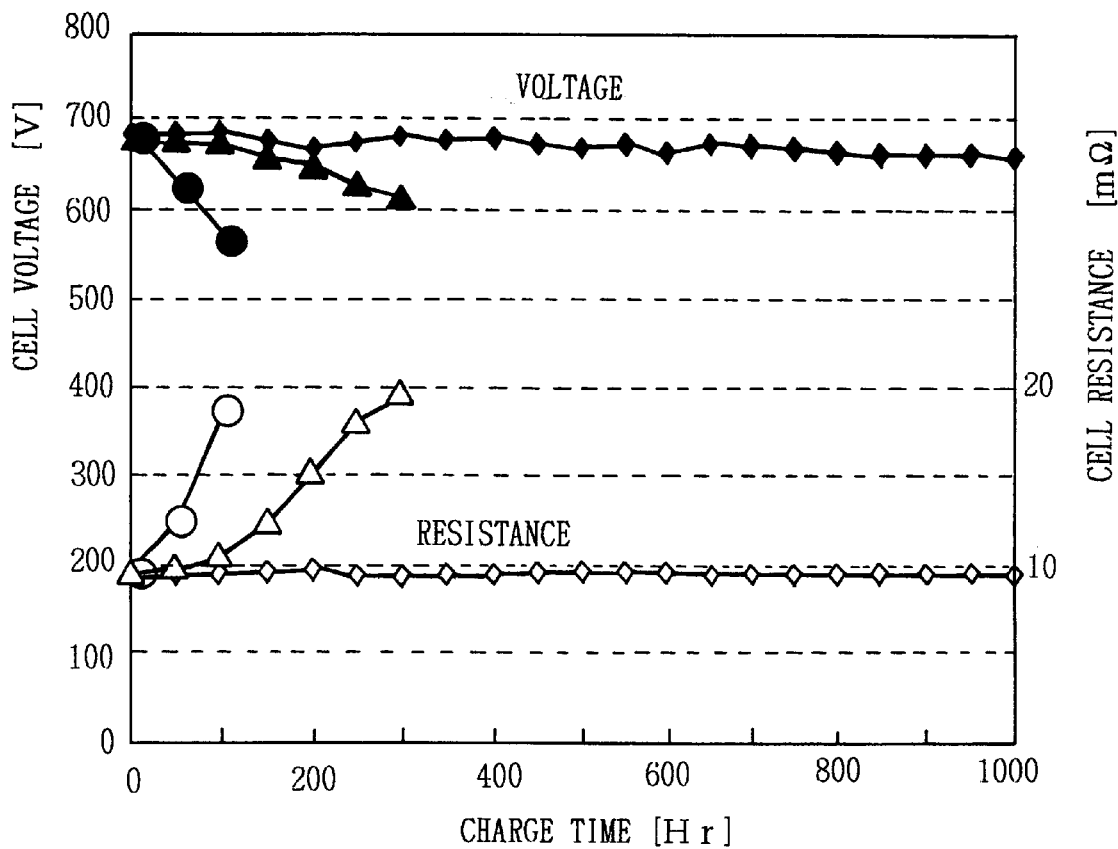
FIG. 7 is a graph indicating changes of the output voltage over time exhibited by various fuel cell batteries.

The effect of the use of separators according to the embodiment in forming a fuel cell was investigated, and results are indicated in FIGS. 6 and 7. FIG. 6 is a diagram indicating the contact resistances per unit area exhibited by various fuel cell batteries that incorporated different separators. The diagram of FIG. 6 indicates the contact resistances per unit area exhibited by: (a) fuel cell batteries incorporating separators formed only from stainless steel, (b) fuel cell batteries incorporating separators having tin-plated stainless steel bases, (c) fuel cell batteries incorporating separators having nickel-plated stainless steel bases, and (d) a fuel cell incorporating separators formed by press-forming a thermal expansion graphite. Two bars for each of the groups (a), (b) and (c) indicate the contact resistance per unit area exhibited by a fuel cell incorporating separators coated with a thermal expansion graphite layer, and the contact resistance per unit area exhibited by a fuel cell incorporating separators not coated with a thermal expansion graphite layer.

The diagram of FIG. 6 indicates that a separator having a very low contact resistance can be obtained by plating a stainless steel base sheet surface with tin, nickel or the like. If separators formed only from stainless steel were incorporated, the contact resistance became high as indicated by bars (a) because of the passive state surface layer of each stainless steel separator. In particular, if the separator surface was coated with a thermal expansion graphite, that is, a material different from stainless steel, the contact resistance further increased. In the fuel cell (d) incorporating separators formed from a thermal expansion graphite, the contact resistance was very low because the separators and the gas diffusion electrodes disposed adjacent to the separators in the fuel cell were both made of carbon material and because a binder, which normally reduces the electric conductivity, was not contained. In the fuel cell batteries (b) and (c) incorporating separators corresponding to the above-described separator according to the embodiment, the contact resistances were approximately as low as that exhibited by the fuel cell (d) incorporating the separators formed from the thermal expansion graphite. The similarly low contact resistances exhibited by the fuel cell batteries (b) and (c), regardless of whether the thermal expansion graphite coating was provided, can be attributed to the relatively short experiment time for measurement of the contact resistance. That is, in a relatively short operation time, different anti-corrosion properties have no substantial effect on the contact resistance.

The graph of FIG. 7 indicates changes in the output voltage exhibited over time by a fuel cell incorporating separators formed only from stainless steel, a fuel cell incorporating separators with tin plating, and a fuel cell incorporating separators with tin plating and thermal expansion graphite coating (corresponding to the separator 30). In the fuel cell incorporating separators corresponding to the separator 30, the resistance did not increase and high output voltages were maintained over long hours of power generation. In contrast, in the fuel cell incorporating separators formed only from stainless steel and the fuel cell incorporating separators having tin-plated stainless steel base sheets, the resistance increased and the output voltage decreased with time due to advancement of surface corrosion.

The separator 30 of this embodiment achieves the above-stated advantages in a fuel cell. It is desirable that the first coating layer 62 have a high surface roughness, in order to increase the adhesion strength between the first coating layer 62 and the second coating layer 64 of thermal expansion graphite and to increase and the adhesion area therebetween and thereby further reduce the contact resistance. A construction wherein the surface roughness of the first coating layer 62 is increased will be described below. Electroless plating is an excellent technique to form a rough plating surface. Electro-plating also allows formation of a rough plating surface because the plating surface roughness (fineness) can easily be controlled by adjusting the plating current density. It is also possible to employ a method in which a third component is added to a plating bath for electroless plating or electroplating and, after the plating process, the third component is removed from the plating layer, thereby forming a rough plating surface. Examples of the third component to be added to the plating bath include resins such as phenol resins, polytetrafluoroethylene, and the like. The resin added to the plating bath as a third component and taken up into the first coating layer 62 can be removed by heat melting, whereby the surface of the first coating layer 62 is roughened.

Graphite may also be added to the plating bath as a third component. If the same graphite material as that used to form the second coating layer 64 is taken up into the first coating layer 62, the contact area between the plating layer forming the first coating layer 62 and the graphite layer forming the second coating layer 64 is increased and the contact resistance is decreased.

Other methods may also be employed to form the first coating layer 62 having a rough surface, for example, a method in which the base sheets 65, 66 are subjected to a plating process prior to the press forming process. That is, a flat stainless steel is first subjected to a surface plating process, and the plated stainless steel sheet is press-formed so as to have predetermined corrugations, in contrast to the production method for the separator 30 illustrated in FIG. 5, in which the base sheets 65, 66 are corrugated in a predetermined manner by press forming, and then plated to form the first coating layers 62. In the surface roughening method, the press forming process forms cracks in the plating layer formed previously by the plating process, so that the surface of the first coating layer 62 can be roughened. If bulging is performed as a press forming process, cracks can be particularly effectively formed. If the base 60 is formed by using a thick stainless steel sheet as described below, the thick stainless steel sheet may be plated and then corrugated by forging, so that cracks can be effectively formed in the plating layer. Furthermore, in stead of the base sheets 65, 66, a clad metal sheet formed by joining a first metal-made base material with a second metal material by rolling or the like may be used. The clad metal sheet is provided with the first coating layer 62, and then press-formed.

A first coating layer 62 with a rough surface may also be formed by a method in which metal micro-powder is jetted (although this method is termed in many ways, such as "shot peening", "drive blast", "shot blast" and the like, the method will hereinafter be collectively referred to as "shot peening"). More specifically, in the shot peening method, metal micro-powder is jetted from a nozzle to an object by compressed air. By jetting tin micro-powder having a particle size of about several ten micro-meters to the base sheets 65, 66, a tin-plating layer having a rough surface but no crack nor pore can be formed as a first coating layer 62 on each of the base sheets 65, 66. During the shot peening process, the kinetic energy of metal micro-powder is converted into thermal energy at the time of impact on an object, so that the object surface temperature increases. If tin micro-powder is jetted, tin micro-powder particles melt on an object surface due to increased surface temperatures, so that tin spreads to form a tin plating layer on the object surface.

To form the first coating layer 62 by shot peening as described above, it is desirable that the metal micro-powder to be jetted to an object be of a metal having a low melting point (of about 500° C. or lower). Examples of the metal that has such a low melting point as to allow formation of the first coating layer 62, that is, a plating layer, by shot peening include tin (Sn), indium (In), lead (Pb), bismuth (Bi), and the like. Furthermore, micro-powder of a Sn—Pb-based alloy, a Sn—Bi-based alloy or a Sn—In-based alloy may also be used.

After the first coating layer 62 having a rough surface is formed, a separator can be completed through the process as described above in conjunction with the first embodiment. That is, the second coating layer 64 of a thermal expansion graphite is formed on the first id coating layer 62 (see step S120 in FIG. 5), and the base sheets 65, 66 provided with the first coating layers 62 and the second coating layers 64 are joined face to face (see step S130 in FIG. 5). Shot peening makes it possible to form a rougher surface of the first coating layer 62 than the above-described electroless plating, the electro-plating, and the method in which a third component is added to the plating bath for electroless plating or electro-plating. Therefore, employment of shot peening increases the adhesion strength between the first coating layer 62 and the second coating layer 64 of a thermal expansion graphite, and increases the contact area therebetween and therefore decreases the contact resistance. The particle size of metal micro-powder for shot peening needs merely to be so small that the plating layer thereby formed becomes a uniform layer without a pore and to be so large that the surface of the plating layer becomes sufficiently rough. The surface roughness of the plating layer can be adjusted by not only the particle size of metal micro-powder but also the pressure of compressed air used for jetting. Compared with the method for forming the first coating layer 62 by electroplating, the method for forming the first coating layer 62 by shot peening has further advantages of less energy consumption and faster plating rate.

Beside the above-described methods, the first coating layer 62 with a rough surface may also be formed by roughening a surface of each of the base sheets 65, 66 prior to the formation of the first coating layer 62, and then forming a plating layer on the roughened surface of each of the base sheets 65, 66. Such a method will be described below.

To roughen the surface of each of the base sheets 65, 66, methods such as shot peening, etching or the like may be employed. Unlike the shot peening described above, the shot peening for roughening the surface of each of the base sheets 65, 66 uses metal micro-powder having such a high melting point that when jetted to an object, the metal micro-powder does not reside on the object surface. By jetting metal micro-powder having such a high melting point to the base sheets 65, 66, the surface thereof can be roughened. The roughness of the surface of each of the base sheets 65, 66 achieved by shot peening can be adjusted by adjusting the particle size of the metal micro-powder, the pressure of compressed air for jetting, or the like. In the case of etching, a predetermined etching solution is used to corrode the surface of each of the base sheets 65, 66 and therefore roughen the surface. The roughness of the surface of each of the base sheets 65, 66 achieved by etching can be adjusted by the concentration of the etching solution, the etching time, the etching temperature, and the like.

After the surface of each of the base sheets 65, 66 is roughened by shot peening, etching or the like, the base sheets 65, 66 are subjected to ordinary electroless plating or electro-plating, so that a first coating layer 62 with a rough surface is formed. After the first coating layer 62 is formed, a process similar to that described in conjunction with the first embodiment is performed. That is, a second coating layer 64 is formed on the first coating layer 62, and the base sheets 65, 66 are joined face to face, thereby completing a separator. If shot peening or etching is employed to roughen the surface, the surface roughness increases and the adhesion strength between the first coating layer 62 and the second coating layer 64 of a thermal expansion graphite further increases. For example, if the first coating layer 62 with a rough surface is formed merely by electroless plating, the surface thereof has an irregularity (protrusions and recesses) of less than about 1 $\mu$m. In contrast, if the first coating layer 62 is formed on a surface of each of the base sheets 65, 66 that has been roughened by shot peening or etching, the surface of the first coating layer 62 has an irregularity (protrusions and recesses) as large as about 1 to several ten micrometers.

The first coating layer 62 with a rough surface may also be formed by a method in which a foaming metal is used to form the first coating layer 62. That is, the first coating layer 62 may be formed by laminating a thin foaming metal film (for example, a foaming nickel film) on a surface of each of the base sheets 65, 66. As in the case where shot peening or the like is employed, the employment of a foaming metal material to form the first coating layer 62 increases the adhesion strength between the first coating layer 62 and the second coating layer 64 formed thereon. A foaming metal material can be laminated on each of the base sheets 65, 66 by various methods. For example, a forming metal material may be adhered to each of the base sheets 65, 66 by using an electrically conductive resin or solder. Furthermore, if the metal sheets of the base sheets 65, 66 are sufficiently soft, a foaming metal material can be laminated on each of the base sheets 65, 66 by press-fitting. The base sheets 65, 66 each carrying a foaming metal material on the surface can be produced by various methods, for example, by preparing a platy member formed by joining a metal sheet that forms a base sheet with a foaming metal material face to face and press-forming the platy member, or by placing a metal sheet and a foaming metal material in a mold in a predetermined sequence and press-forming and laminating them simultaneously.

In the case where a foaming metal material is laminated on each of the base sheets 65, 66, it is also possible to form a plating layer on each of the base sheets 65, 66 before the foaming metal material is laminated. In particular, if a sheet of stainless steel, which tends to form a passive state film on a surface thereof, or a sheet of aluminum, which tends to form on a surface thereof an oxide film having substantially no electric conductivity, is used, the plating process prior to the process of laminating the foaming metal material advantageously secures a sufficiently high electric conductivity of a separator because the passive state film or oxide film on each of the base sheets 65, 66 is removed for the plating process.

As can be understood from the above description, the press-forming process for forming predetermined corrugations of a separator 30 may be performed either before or after the first coating layer 62 is formed. Since the thermal expansion graphite of the second coating layer 64 has an excellent extensibility, the second coating layer 64 may also be formed either before or after the process of press-forming predetermined corrugations. That is, the press-forming process of the base sheets 65, 66 may be performed either before or after the first coating layer 62 and the second coating layer 64 are formed on the base sheets 65, 66.

When the base sheets 65, 66 of the separator 30 are joined face to face, predetermined spaces 500 are defined by inner surfaces of ridge portions of the base sheets 65, 66. A sufficiently high electric conductivity is provided for the separator 30 by regions of the base sheets 65, 66 that are joined (regions of groove portions of the base sheets 65, 66). Therefore, the spaces 500 may be left as they are. The spaces 500 may also be filled with an electrically conductive material, such as carbon paste, in order to further increase the electric conductivity of the separator 30.

Figure 8:
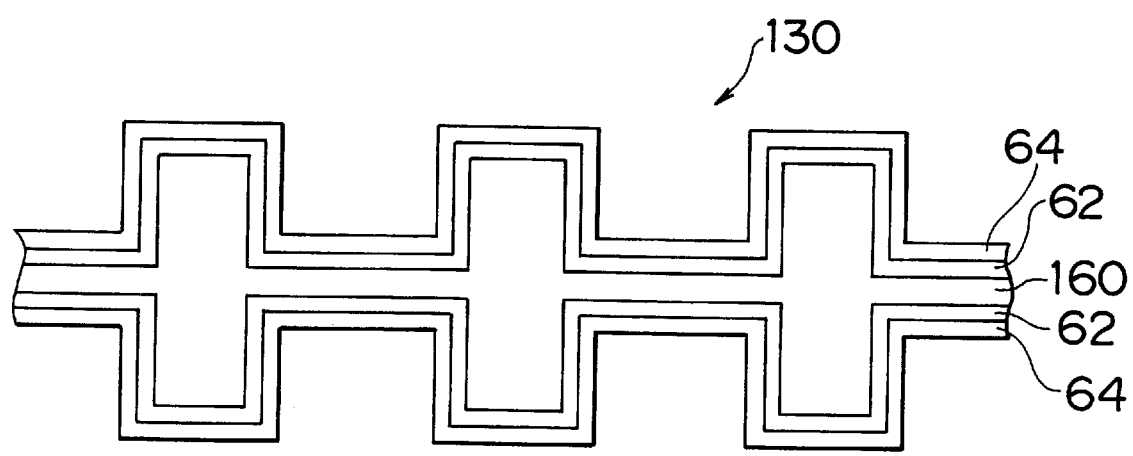
FIGS. 8 through 11 are schematic illustrations of the constructions of separators.

Although the foregoing embodiments use, as the base sheets 65, 66, articles formed from thin plates or sheets, such as bent articles, half-sheered articles or the like, it is also possible to use articles formed from thick plates or sheets by forging, casting or the like. If a forged or cast article is used instead of thin plate-formed articles used in the foregoing embodiments, a structure having predetermined corrugations can be formed on opposite sides of the article during the forging or casting process, so that it becomes unnecessary to join two base sheets face to face. FIG. 8 shows the construction of a separator 130 formed by using a forged article. The above-described separator 30 includes the base 60 formed of the base sheets 65, 66 whereas the separator 130 shown in FIG. 8 includes a base 160 having predetermined corrugations formed on its opposite sides by forging. Similar to the base 60, the base 160 is formed from a metal such as stainless steel, aluminum or the like. The surfaces of the base 160 are coated with a first coating layer 62 and a second coating layer 64 similar to those formed on the separator 30.

Figure 9:
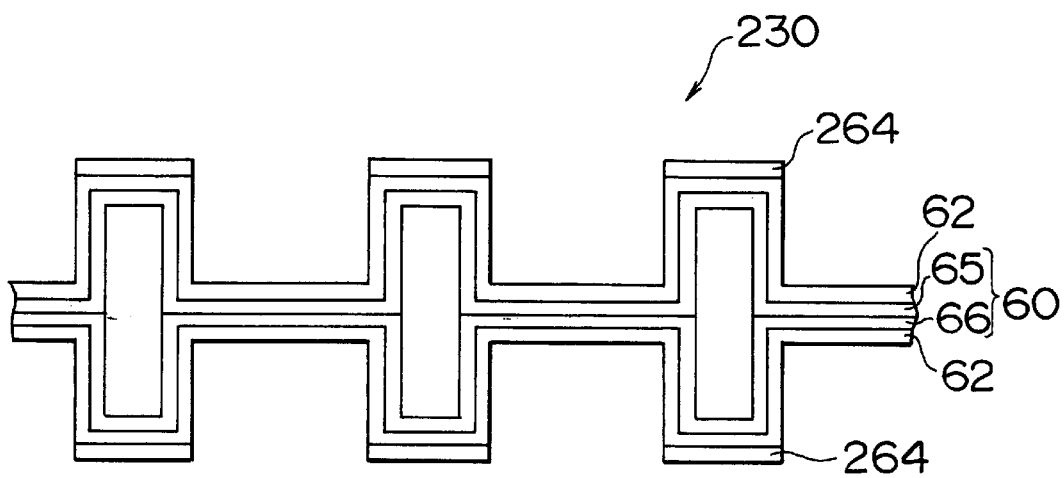

Although in the separator 30 and the separator 130, the entire surfaces of the base 60, 160 are coated with the first coating layer 62 and the second coating layer 64, it is also possible to form a first coating layer and a second coating layer only on a portion (or portions) of the surfaces of the base. As an example of such a construction, a separator 230 is shown in FIG. 9. Similar to the separator 30, the separator 230 has a base 60 formed of base sheets 65, 66. The surfaces of the base 60 are coated with a first coating layer 62 of an electrically conductive material similar to that used in the foregoing embodiments. Portions of each first coating layer 62 formed on the base 60 are coated with a second coating layer 264 of a carbon material similar to that used in the foregoing embodiments. The regions where the second coating layer islands 264 are formed contact the adjacent gas diffusion electrodes when incorporated in a fuel cell.

If separators 230 as described above are used to form a fuel cell, the contact faces between adjacent separators 230 can be provided with a sufficiently high electric conductivity and a sufficiently high corrosion resistance as in the foregoing embodiments. Therefore, the internal resistance of the fuel cell can be sufficiently reduced and the output voltage of the fuel cell can be reliably increased to a sufficiently high level. Furthermore, since the second coating layer islands 264 are formed only on portions of the surfaces of the base 60, the separator production cost can be reduced, in comparison with the separators according to the foregoing embodiments.

The separator 230 is different from the separators according to the foregoing embodiments in that a second coating layer of a carbon material is not formed in regions other than the contact faces. Such regions are regions where a sufficiently high electric conductivity is not needed when the separators 230 are incorporated into a fuel cell, for example, regions where the fuel gas passages 24P and the oxidative gas passages 25P are formed in the fuel cell. Therefore, the electrically conductive material that forms the first coating layer 62 may be a material that oxidizes and therefore loses the surface electric conductivity during operation of the fuel cell, as long as the degree or extent of corrosion that progresses under environmental conditions for the operation of the fuel cell is within a predetermined allowable range. The second coating layer 264 may be formed from a carbon material similar to that used for the second coating layer 64.

Figure 10:
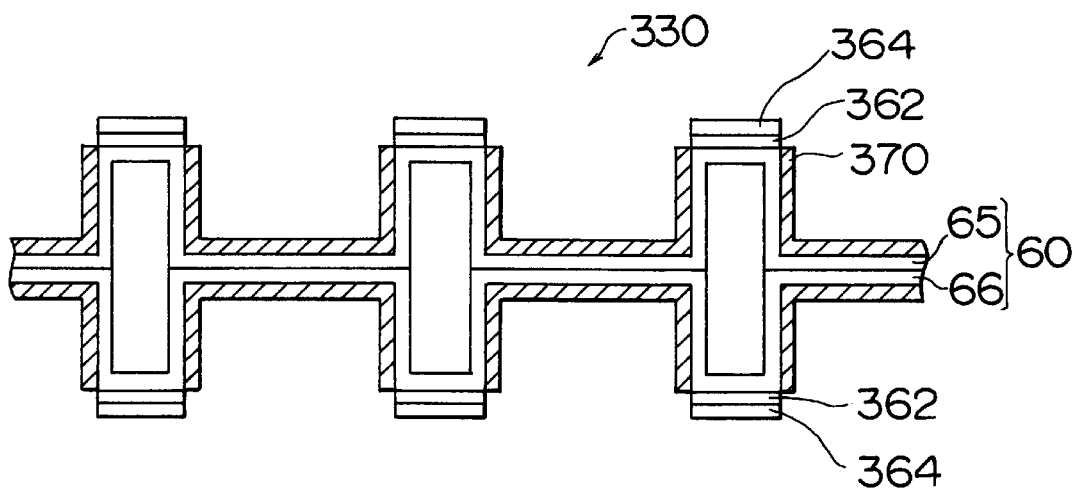

The fuel cell gas separator described above needs merely to secure a sufficiently high electric conductivity as well as corrosion resistance in the contact faces between the separator and adjacent members in a fuel cell, and the regions other than the contact faces need merely to have a predetermined corrosion resistance. Although in the separator 230, the corrosion resistance of the regions other than the contact faces is secured by the first coating layer 62 formed from an electrically conductive material, it is also possible to secure a corrosion resistance of the contact faces by using a different construction. As an example of such a construction, a separator 330 is shown in FIG. 10.

Similar to the separators in the foregoing embodiments, the separator 330 includes a base 60 made up of the base sheets 65, 66. A first coating layer 362 of an electrically conductive material and a second coating layer 364 of a carbon material are formed in each of regions corresponding to contact faces that contact adjacent members in a fuel cell. The first coating layer 362 and the second coating layer 364 may be formed from substantially the same materials in substantially the same manners as the first coating layer 62 and the second coating layer 64 of the separator 30. In each of regions other than the contact faces of the separator 330, a hydrophilic layer 370 is formed by coating the base 60. The hydrophilic layer 370 is formed from a hydrophilic material, for example, silicon oxide, a water absorbing resin, or the like.

The effect of hydrophilic surfaces of the regions other than the contact faces, more specifically, hydrophilic surfaces that define the fuel gas passages 24P and the oxidative gas passages 25P, will be explained.

In a fuel cell incorporating separators 330, the aforementioned electrochemical reactions expressed by equations (1), (2) and (3) occur. With progress of the electrochemical reactions, water is produced at the cathode side as indicated by equation (2). Water thus produced evaporates into the oxidative gas and, normally, it is let out of the fuel cell. However, in a region where temperature is locally lower in the fuel cell, as for example, water may possibly condense giving rise to a danger of impeding flow of the oxidative gas in an oxidative gas passage. Furthermore, the electrochemical reaction occurring at the anode side produces protons as expressed by equation (1). Since protons hydrate with water molecules and migrate in the solid electrolyte membrane, it is a normal practice to replenish the solid electrolyte membrane with moisture from the cathode side during operation of the fuel cell by humidifying the fuel gas before the fuel gas is supplied into the fuel cell. Therefore, in the gas passages conducting the humidified fuel gas, too, water may possibly condense and impede flow of the fuel gas. However, if the surfaces that define the fuel gas passages 24P and the oxidative gas passages 25P in each unit cell 28 of the fuel cell are hydrophilic, water condensed in a gas passage in a unit cell 28 will be guided and led by a hydrophilic wall surface of the passage together with the gas flow therein so that water will easily be discharged from the unit cell 28.

Therefore, incorporation of separators 330 in a fuel cell achieves an advantage of improving the water drainage from each unit cell 28 of the fuel cell, in addition to the advantage of securing a sufficient electric conductivity and a sufficient corrosion resistance of the contact faces that contact with adjacent gas diffusion electrodes. Furthermore, the provision of the hydrophilic layers 370 improves the water drainage from the gas passages and secures a sufficient corrosion resistance of the regions of each separator 330 that define gas passages. That is, in the regions of the separators 330 defining the gas passages, the hydrophilic layers 370 improve the water drainage and, at the same time, achieve a sufficiently high corrosion resistance, so that the coating layer of an electrically conductive material and/or the coating layer of a carbon material may be omitted in those regions.

Figure 11:
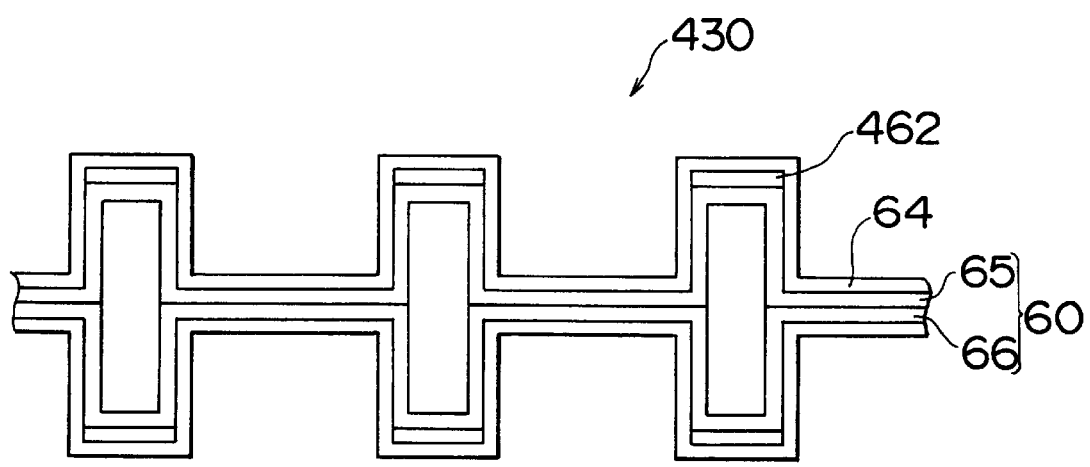

Although in the foregoing embodiments, the second coating layer of a carbon material is formed only on the first coating layer of an electrically conductive material, it is also possible to form the second coating layer in regions where the first coating layer is not formed, so that the second coating layer of a carbon material will secure a corrosion resistance in the gas passages in each unit cell. As an example of such a gas separator, a separator 430 is shown in FIG. 11.

Similar to the separators in the foregoing embodiments, the separator 430 includes a base 60 made up of base sheets 65, 66. A first coating layer 462 of an electrically conductive material similar to that used in the foregoing embodiments and a second coating layer 64 of a carbon material covering the first coating layer 462 are formed in regions of the surfaces of the base 60 corresponding to contact faces that contact adjacent members in a fuel cell. The first coating layer 462 is formed only on the contact faces of the base 60, from which a passive state film or an oxide film has been removed. In contrast, the second coating layer 64 is formed over the entire surfaces of the base 60.

The separator 430 is provided with a sufficiently high corrosion resistance by the second coating layer 64 covering the entire surfaces. In the contact faces, after the passive state film or the oxide film is removed from the base 60, the first coating layer 462 is formed and the second coating layer 64 is formed covering the first coating layer 462. Therefore, as in the foregoing embodiments, a sufficiently high electric conductivity in the contact faces is secured. Since the first coating layer 462 is formed only on the contact faces, the amount of the electrically conductive material used to form the first coating layer can be reduced. Furthermore, since there is no need to secure an electric conductivity in the regions other than the contact faces, it becomes unnecessary to remove the passive state film or the oxide film from those regions of the base 60. Therefore, the production process can be simplified.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. A polymer electrolyte fuel cell, comprising:
a metallic base member as a separator;
a first coating layer covering at least a portion of a surface of the base member, the first coating layer being formed from a first electrically conductive material; and
a second coating layer covering at least a portion of the first coating layer, the second coating layer being formed from a second electrically conductive material different from the first electrically conductive material,
wherein at least a portion of the first coating layer is formed at least on a face of the separator that contacts a second component member of the fuel cell.

2. A fuel cell according to claim 1, wherein the second electrically conductive material is a carbon material.

3. A fuel cell according to claim 2, wherein the carbon material includes a thermal expansion graphite.

4. A fuel cell according to claim 2, wherein the second coating layer contains a resin having acid resistance.

5. A fuel cell according to claim 4, wherein the resin is selected from the group consisting at least one of acryl resin, polyester resin, urethane resin, phenol resin and phenol-epoxy resin.

6. A fuel cell according to claim 1, wherein the at least a portion of the base member on which the first coating layer is formed is electrically conductive.

7. A fuel cell according to claim 1, wherein the first coating layer has a rough surface.

8. A fuel cell according to claim 1, wherein at least a portion of the base member on which the first coating layer is formed has a rough surface.

9. A fuel cell according to claim 1, wherein, when oxidized, the first coating layer remains electrically conductive.

10. A method according to claim 1, wherein the first electrically conductive material is one of a base metal and an electrically conductive ceramic.

11. A method of producing a polymer electrolyte fuel cell, comprising:

forming a separator base member having a predetermined shape, the separator base member constituting a first component member of the fuel cell;

forming a first coating layer of a first electrically conductive material on at least a portion of a surface of the separator base member which contacts a second component member of the fuel cell;

forming on at least a portion of the first coating layer a second coating layer of a second electrically conductive material; and incorporating said separator base member into said polymer electrolyte fuel cell.

12. A method according to claim 11, wherein the second electrically conductive material is a carbon material.

13. A method according to claim 12, wherein the carbon material includes a thermal expansion graphite.

14. A method according to claim 12, wherein the second coating layer contains a resin having acid resistance.

15. A method according to claim 14, wherein the resin is selected from the group consisting at least one of acryl resin, polyester resin, urethane resin, phenol resin and phenol-epoxy resin.

16. A method according to claim 11, wherein if the separator base member forms a substantially non-electrically conductive coating on a surface thereof, the substantially non-electrically conductive coating is removed from at least the portion of the surface of the base member on which the first coating layer is to be formed.

17. A method according to claim 11, wherein the step of forming the first coating layer includes the substep of roughening the surface of the first coating layer.

18. A method according to claim 11, wherein prior to the first coating layer forming step, a rough surface is formed at least in a region of the substrate base member where the first coating layer is to be formed.

19. A method according to claim 11, wherein, when oxidized, the first electrically conductive material remains electrically conductive.

20. A method according to claim 11, wherein the first electrically conductive material is one of a base metal and an electrically conductive ceramic.

21. A method of producing a polymer electrolyte fuel cell, comprising the steps of:

preparing a base metallic member as a separator;

coating a surface of the base member with a first coating layer of a first electrically conductive material;

forming the base member carrying the first coating layer thereon, by using a die; and coating at least a portion of the first coating layer with a second coating layer of a material that is different from the first electrically conductive; and incorporating said base metallic member into said polymer electrolyte fuel cell.

22. A method according to claim 21, wherein the second electrically conductive material is a carbon material.

23. A method according to claim 21, wherein, when the base member includes a substantially non-electrically conductive coating on a surface thereof, the method further comprises the step of removing the substantially non-electrically conductive coating from at least a portion of the surface of the base member on which the first coating layer is to be formed.

* * * * *

UNITED STATES PATENT AND TRADEMARK OFFICE
CERTIFICATE OF CORRECTION

| | |
|---|---|
| PATENT NO. | : 6,291,094 B1 |
| APPLICATION NO. | : 09/303997 |
| DATED | : September 18, 2001 |
| INVENTOR(S) | : Joji Yoshimura et al. |

It is certified that error appears in the above-identified patent and that said Letters Patent is hereby corrected as shown below:

In the Title Page: Change the "Assignee" information as follows:

(73) Assignee(s): Toyota Jidosha Kabushiki Kaisha, Toyota (JP)
Toyo Kohan Co., Ltd., Chiyoda-Ku (JP)

Signed and Sealed this

Fifteenth Day of August, 2006

JON W. DUDAS
*Director of the United States Patent and Trademark Office*